United States Patent
Takeyoshi et al.

(10) Patent No.: US 9,581,091 B2
(45) Date of Patent: Feb. 28, 2017

(54) CONTROL DEVICE FOR ENGINE

(71) Applicant: Mazda Motor Corporation, Aki-gun, Hiroshima (JP)

(72) Inventors: Toru Takeyoshi, Hiroshima (JP); Keisuke Agusa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/858,938

(22) Filed: Sep. 18, 2015

(65) Prior Publication Data

US 2016/0258364 A1    Sep. 8, 2016

(30) Foreign Application Priority Data

Mar. 3, 2015   (JP) ................................ 2015-041634

(51) Int. Cl.
| | |
|---|---|
| *B60T 7/12* | (2006.01) |
| *F02D 11/10* | (2006.01) |
| *F02D 11/02* | (2006.01) |
| *F02D 41/00* | (2006.01) |
| F02D 41/02 | (2006.01) |
| F02D 41/10 | (2006.01) |
| F02D 41/24 | (2006.01) |

(52) U.S. Cl.
CPC ............ *F02D 11/105* (2013.01); *F02D 11/02* (2013.01); *F02D 41/0002* (2013.01); *F02D 11/107* (2013.01); *F02D 41/0225* (2013.01); *F02D 41/10* (2013.01); *F02D 41/2422* (2013.01); *F02D 2041/001* (2013.01); *F02D 2200/501* (2013.01); *F02D 2250/18* (2013.01)

(58) Field of Classification Search
CPC .. F02B 19/1052; F02B 37/18; F02D 2700/02; F02D 33/00; F02D 41/266; F02D 2041/227; F02D 41/007; F02D 11/106; F02D 9/02; B60W 2030/206
USPC .......... 701/101, 103, 107, 110, 111, 114, 115
See application file for complete search history.

(56) References Cited

U.S. PATENT DOCUMENTS

2015/0066335 A1*  3/2015  Kishi .................... F02D 41/021
                                                              701/103
2015/0377156 A1* 12/2015  Hagari ................ F02D 41/0007
                                                               60/602

(Continued)

FOREIGN PATENT DOCUMENTS

JP           2005155412 A      6/2005

*Primary Examiner* — John Kwon
(74) *Attorney, Agent, or Firm* — Alleman Hall McCoy Russell & Tuttle LLP

(57) ABSTRACT

A control system for an engine is provided, which includes an accelerator opening acquiring module for acquiring an accelerator opening, a target acceleration setting module for setting a target acceleration of a vehicle based on the acquired accelerator opening, and an engine control module for adjusting an engine torque to achieve the set target acceleration. By utilizing first to third ranges defined for the accelerator opening and first to third acceleration characteristic maps, the target acceleration setting module selects one of the first to third acceleration characteristic maps according to a range under which the acquired accelerator opening falls among the first to third ranges, and the target acceleration setting module sets the target acceleration corresponding to the acquired accelerator opening based on the selected map.

8 Claims, 7 Drawing Sheets

(56) References Cited

U.S. PATENT DOCUMENTS

2016/0137197 A1* 5/2016 Hayakawa ............. B60K 26/04
                                                          701/70
2016/0258365 A1* 9/2016 Takeyoshi ............. F02D 11/105
2016/0273469 A1* 9/2016 Takeyoshi ............... F02D 41/10

* cited by examiner

CONTROL DEVICE FOR ENGINE

BACKGROUND

The present invention relates to a control device for an engine, particularly to a control device for an engine, which adjusts an engine torque according to an operation of an accelerator pedal by a driver.

JP2005-155412A discloses such a kind of art. In JP2005-155412A, a target torque of an engine is set based on a state of an accelerator operated by a driver, and an output torque of the engine is adjusted to reach the target torque by adjusting a throttle opening and/or an ignition timing. Specifically, in this art, an output torque of an engine is adjusted such that a longitudinal acceleration of a vehicle becomes higher as a depressing speed of an accelerator pedal (i.e., a differential value of an accelerator opening) becomes higher, so as to gain an acceleration feeling and reduce vibration of the vehicle in its longitudinal direction.

Meanwhile, when traveling on a rotary, a roundabout (a circular intersection where a plurality of branch roads are connected with a circular passage, which is usually seen in Europe), or a limited speed zone where a vehicle speed is limited to be low, a driver intends to drive at a constant vehicle speed. In this case, the driver tends to operate the accelerator pedal slightly and repeatedly so as to keep the vehicle speed constant. With the conventional art, when the driver operates the accelerator pedal slightly and repeatedly as described above, the acceleration varies according to the variation of the accelerator opening. Therefore, it is difficult to keep the vehicle speed constant. In other words, with the conventional art, it is difficult to control the vehicle to maintain the constant vehicle speed.

SUMMARY

The present invention is made in view of the above situations and aims to provide a control device for an engine, which improves a characteristic of an acceleration that is in relation to an operation of an accelerator, and can easily keep a vehicle speed constant.

According to one aspect of the present invention, a control system for an engine is provided. The control system includes an accelerator opening acquiring module for acquiring an opening of an accelerator, a target acceleration setting module for setting a target acceleration of a vehicle based on the accelerator opening acquired by the accelerator opening acquiring module, and an engine control module for adjusting an engine torque to achieve the target acceleration set by the target acceleration setting module. The accelerator opening is defined to have a first range including a value of the accelerator opening at which the target acceleration becomes zero, a second range where the accelerator opening is larger than the first range, and a third range where the accelerator opening is smaller than the first range, and first to third acceleration characteristic maps in which a relationship between the accelerator opening and the target acceleration is defined are applied to the first to third ranges, respectively. The target acceleration setting module selects one of the first to third acceleration characteristic maps according to a range under which the acquired accelerator opening falls among the first to third ranges, and the target acceleration setting module sets the target acceleration corresponding to the acquired accelerator opening based on the selected map. The first acceleration characteristic map is defined such that an inclination indicating a change of the target acceleration with respect to a change of the accelerator opening is smaller than that in the second acceleration characteristic map and larger than that in the third acceleration characteristic map. With this configuration, by using such first to third acceleration characteristic maps, the target acceleration corresponding to the accelerator opening is set and the engine torque is adjusted.

According to this configuration, the first acceleration characteristic map in which the inclination indicating the change of the target acceleration with respect to the change of the accelerator opening is gradual is applied within the first range including the value of the accelerator opening at which the target acceleration becomes zero. Therefore, when traveling on a rotary, a roundabout, or a limited speed zone where a vehicle speed is limited to be low, even if a driver operates an accelerator pedal slightly and repeatedly so as to keep the vehicle speed constant, a variation of the target acceleration which is set according the accelerator opening corresponding to such an accelerator operation becomes small. As a result, the vehicle speed can suitably be kept substantially constant. Therefore, according to this configuration, the driver can easily maintain the constant vehicle speed, in other words, can easily control the vehicle to maintain the constant vehicle speed.

Further, according to this configuration, the second acceleration characteristic map in which the inclination indicating the change of the target acceleration with respect to the change of the accelerator opening is comparatively steep is applied within the second range where the accelerator opening is larger than the first range. Therefore, the vehicle can swiftly be accelerated according to an increase of the accelerator opening within the second range. In other words, the driver can gain a satisfactory acceleration feeling. In addition, according to this configuration, the third acceleration characteristic map in which the inclination indicating the change of the target acceleration with respect to the change of the accelerator opening is more gradual than the first acceleration characteristic map is applied within the third range where the accelerator opening is smaller than the first range. Therefore, variation of the acceleration according to the variation of the accelerator opening within a small value range, for example, the variation of the accelerator opening caused by the playing of the accelerator pedal, can suitably be suppressed.

The first acceleration characteristic map is preferably defined such that the change of the target acceleration with respect to the change of the accelerator opening becomes substantially constant regardless of a gear position of the vehicle.

With this configuration, the first acceleration characteristic map is defined such that the change of the target acceleration with respect to the change of the accelerator opening becomes substantially constant regardless of the gear position. Thus, within the first range, the change of the acceleration with respect to the change of the accelerator opening can be substantially the same among various gear positions. Therefore, the constant vehicle speed can easily be maintained regardless of the gear position.

The first acceleration characteristic map is preferably defined such that the change of the target acceleration with respect to the change of the accelerator opening becomes substantially constant regardless of a vehicle speed.

According to such a configuration, the first acceleration characteristic map is defined such that the change of the target acceleration with respect to the change of the accelerator opening becomes substantially constant regardless of the vehicle speed. Thus, within the first range, the change of the acceleration with respect to the change of the accelerator opening can be substantially the same among various vehicle speeds. Therefore, the constant vehicle speed can easily be maintained regardless of the vehicle speed.

According to another aspect of the present invention, a method of controlling an engine is provided. The method includes acquiring an opening of an accelerator, setting a target acceleration of a vehicle based on the acquired accelerator opening, and adjusting an engine torque to achieve the set target acceleration. The accelerator opening is defined to have a first range including a value of the accelerator opening at which the target acceleration becomes zero, a second range where the accelerator opening is larger than the first range, and a third range where the accelerator opening is smaller than the first range, and first to third acceleration characteristic maps in which a relationship between the accelerator opening and the target acceleration is defined are applied to the first to third ranges, respectively. The setting of the target acceleration includes selecting one of the first to third acceleration characteristic maps according to a range under which the acquired accelerator opening falls among the first to third ranges, and setting the target acceleration corresponding to the acquired accelerator opening based on the selected map. The first acceleration characteristic map is defined such that an inclination indicating a change of the target acceleration with respect to a change of the accelerator opening is smaller than that in the second acceleration characteristic map and larger than that in the third acceleration characteristic map. With this configuration, by using such first to third acceleration characteristic maps, the target acceleration corresponding to the accelerator opening is set and the engine torque is adjusted.

According to this configuration, the first acceleration characteristic map in which the inclination indicating the change of the target acceleration with respect to the change of the accelerator opening is gradual is applied within the first range including the value of the accelerator opening at which the target acceleration becomes zero. Therefore, when traveling on a rotary, a roundabout, or a limited speed zone where a vehicle speed is limited to be low, even if a driver operates an accelerator pedal slightly and repeatedly so as to keep the vehicle speed constant, a variation of the target acceleration which is set according to the accelerator opening corresponding to such accelerator operation becomes small. As a result, the vehicle speed can suitably be kept substantially constant. Therefore, according to this configuration, the driver can easily maintain the constant vehicle speed, in other words, can easily control the vehicle to maintain the constant vehicle speed.

Further, according to this configuration, the second acceleration characteristic map in which the inclination indicating the change of the target acceleration with respect to the change of the accelerator opening is comparatively steep is applied within the second range where the accelerator opening is larger than the first range. Therefore, the vehicle can swiftly be accelerated according to an increase of the accelerator opening within the second range. In other words, the driver can gain a satisfactory acceleration feeling. In addition, according to this configuration, the third acceleration characteristic map in which the inclination indicating the change of the target acceleration with respect to the change of the accelerator opening is more gradual than the first acceleration characteristic map which is applied within the third range where the accelerator opening is smaller than the first range. Therefore, variation of the acceleration according to the variation of the accelerator opening within a small value range, for example, the variation of the accelerator opening caused by the playing of the accelerator pedal, can suitably be suppressed.

DETAILED DESCRIPTION OF EMBODIMENT

Hereinafter, a control device for an engine according to one embodiment of the present invention is described with reference to the appended drawings.
<System Configuration>

Figure 1:
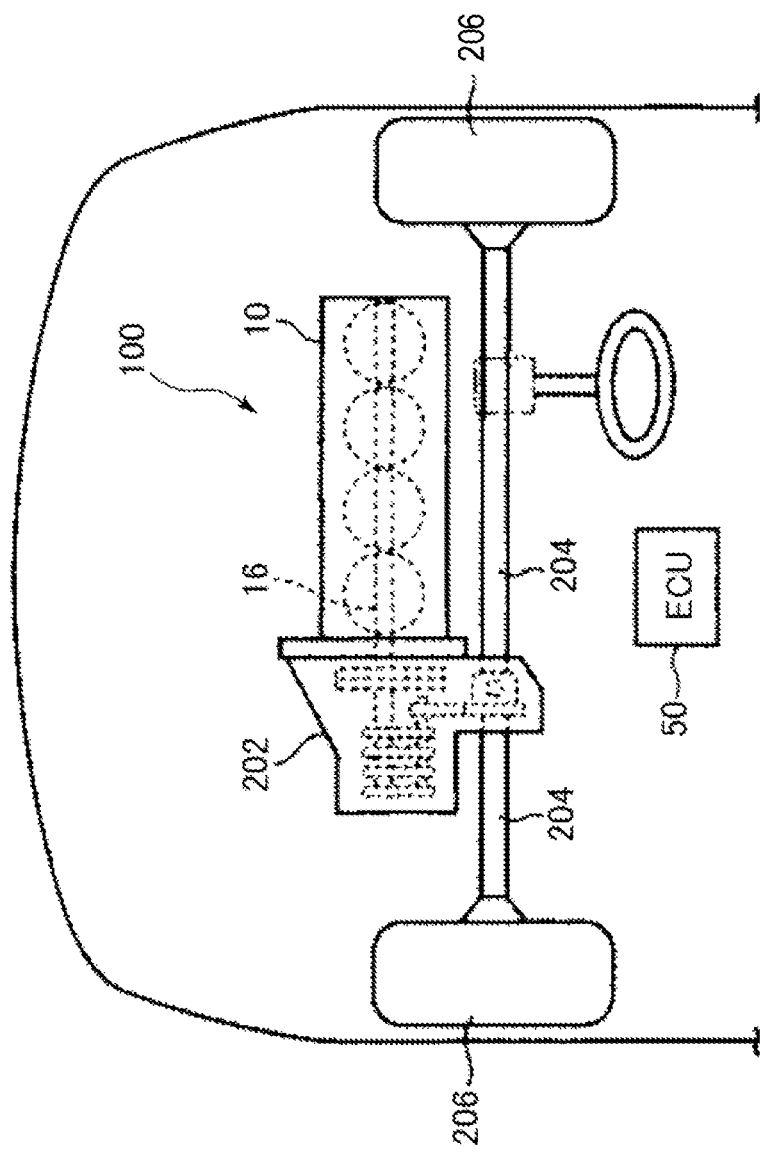
FIG. 1 is a plan view illustrating a schematic configuration of a vehicle to which a control device for an engine according to one embodiment of the present invention is applied.
Figure 2:
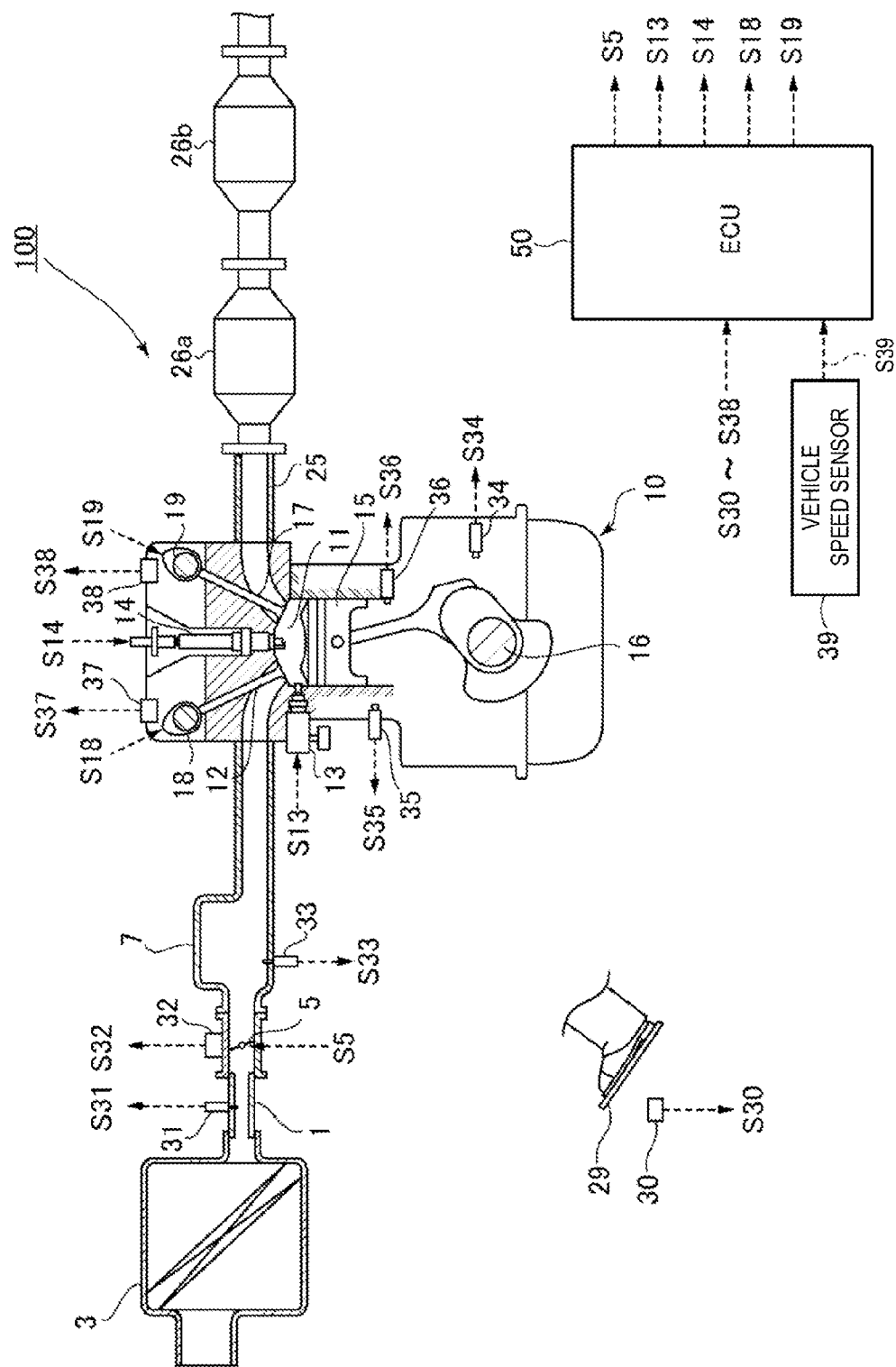
FIG. 2 is a view illustrating a schematic configuration of an engine system to which the control device for the engine according to the embodiment of the present invention is applied.

First, an engine system to which the control device for the engine of this embodiment is applied is described with reference to FIGS. 1 and 2. FIG. 1 is a plan view illustrating a schematic configuration of a vehicle to which the control device for the engine according to this embodiment of the present invention is applied. FIG. 2 is a view illustrating a schematic configuration of the engine system to which the control device for the engine according to this embodiment of the present invention is applied.

As illustrated in FIG. 1, in the vehicle, the engine 10 of the engine system 100 produces an engine torque (drive torque) as a thrust of the vehicle by causing combustion of mixture gas containing fuel and air, and transfers the engine torque to a transmission 202 via a crankshaft 16. The transmission 202 changes a gear position among a plurality of positions (e.g., first to sixth ranges), and at a gear position set by the transmission 202, the engine torque from the engine 10 is transferred, via a pair of drive shafts 204, to a pair of wheels 206 attached to outer end parts of the drive shafts 204 in vehicle width directions, respectively.

Further, in the vehicle, an ECU (Electronic Control Unit) 50 performs various controls within the vehicle. In this embodiment, the ECU 50 functions as the control device or control system of the engine. Alternatively, the control system of the engine may be distributed among multiple processors or control unit devices. According to an operation of an accelerator pedal (accelerator) by a driver, the ECU 50 adjusts the engine torque which is outputted by the engine 10, and supplies the engine torque to the vehicle. Thus, the ECU 50 improves a characteristic of an acceleration of the vehicle that is in relation to the accelerator operation. As a result, the ECU 50 can easily keep a vehicle speed constant.

As illustrated in FIG. 2, the engine system 100 includes an intake passage 1 through which intake air (air) introduced from outside passes, the engine (specifically, gasoline engine) 10 for producing a drive force of the vehicle by causing combustion of the mixture gas containing the intake air supplied from the intake passage 1 and the fuel supplied from a fuel injector 13 (described later), an exhaust passage 25 for discharging exhaust gas produced by the combustion within the engine 10, sensors 30 to 39 for detecting various states regarding the engine system 100, and the ECU 50 for controlling the engine system 100 entirely.

The intake passage 1 is provided with, from its upstream side in the following order, an air cleaner 3 for purifying the intake air introduced from outside, a throttle valve 5 for adjusting an amount of intake air passing therethrough (intake air amount), and a surge tank 7 for temporarily storing the intake air to be supplied to the engine 10.

The engine 10 mainly includes an intake valve 12 for introducing, into a combustion chamber 11, the intake air supplied from the intake passage 1, the fuel injector 13 for injecting the fuel to the combustion chamber 11, an ignition plug 14 for igniting the mixture gas (containing the intake air and the fuel) supplied into the combustion chamber 11, a piston 15 for reciprocating due to the combustion of the mixture gas within the combustion chamber 11, the crankshaft 16 which is rotated by the reciprocation of the piston 15, and an exhaust valve 17 for discharging, to the exhaust passage 25, the exhaust gas produced by the combustion of the mixture gas within the combustion chamber 11.

Moreover, the engine 10 varies operation timings of the intake and exhaust valves 12 and 17 (corresponding to phases of the valves) by a variable intake valve mechanism 18 and a variable exhaust valve mechanism 19 (both being a variable valve timing mechanism), respectively. Various known types thereof may be applied for the variable intake valve mechanism 18 and the variable exhaust valve mechanism 19, and for example, an electromagnetic-operated type mechanism or a hydraulic type mechanism may be used to change the operation timings of the intake valve 12 and the exhaust valve 17.

The exhaust passage 25 is mainly provided with exhaust gas purifying catalysts 26a and 26b having a function of purifying the exhaust gas, such as an NOx catalyst, a three-way catalyst, or an oxidation catalyst. Hereinafter, when the exhaust gas purifying catalysts 26a and 26b are not differentiated, they may each simply be described as the "exhaust gas purifying catalyst 26."

Further, the engine system 100 is provided with the sensors 30 to 39 for detecting the various states regarding the engine system 100. The sensors 30 to 39 are specifically as follows: the accelerator opening sensor 30 for detecting a position of the accelerator pedal 29 (corresponding to an amount by which the driver depresses the accelerator pedal 29); the airflow sensor 31 for detecting the intake air amount corresponding to the flow rate of the intake air passing through the intake passage 1; the throttle opening sensor 32 for detecting an opening of the throttle valve 5 (throttle opening); the pressure sensor 33 for detecting an intake manifold pressure corresponding to the pressure of the intake air which is supplied to the engine 10; the crank angle sensor 34 for detecting a crank angle of the crankshaft 16; the water temperature sensor 35 for detecting a temperature of cooling water for cooling the engine 10 (water temperature); the temperature sensor 36 for detecting a temperature inside a cylinder of the engine 10 (in-cylinder temperature); the cam angle sensors 37 and 38 for detecting the operation timings (including close timings) of the intake and exhaust valves 12 and 17, respectively; and the vehicle speed sensor 39 for detecting the speed of the vehicle (vehicle speed). These various sensors 30 to 39 output respective detection signals S30 to S39 corresponding to the detected parameters, to the ECU 50.

The ECU 50 controls the components of the engine system 100 based on the detection signals S30 to S39 received from the various sensors 30 to 39 described above. Specifically, the ECU 50 supplies a control signal S5 to the throttle valve 5 to adjust open and close timings of the throttle valve 5 and the throttle opening, supplies a control signal S13 to the fuel injector 13 to adjust a fuel injection amount and a fuel injection timing, supplies a control signal S14 to the ignition plug 14 to adjust an ignition timing, and supplies control signals S18 and S19 to the variable intake valve mechanism 18 and the variable exhaust valve mechanism 19 to adjust the operation timings of the intake and exhaust valves 12 and 17, respectively.

Figure 3:
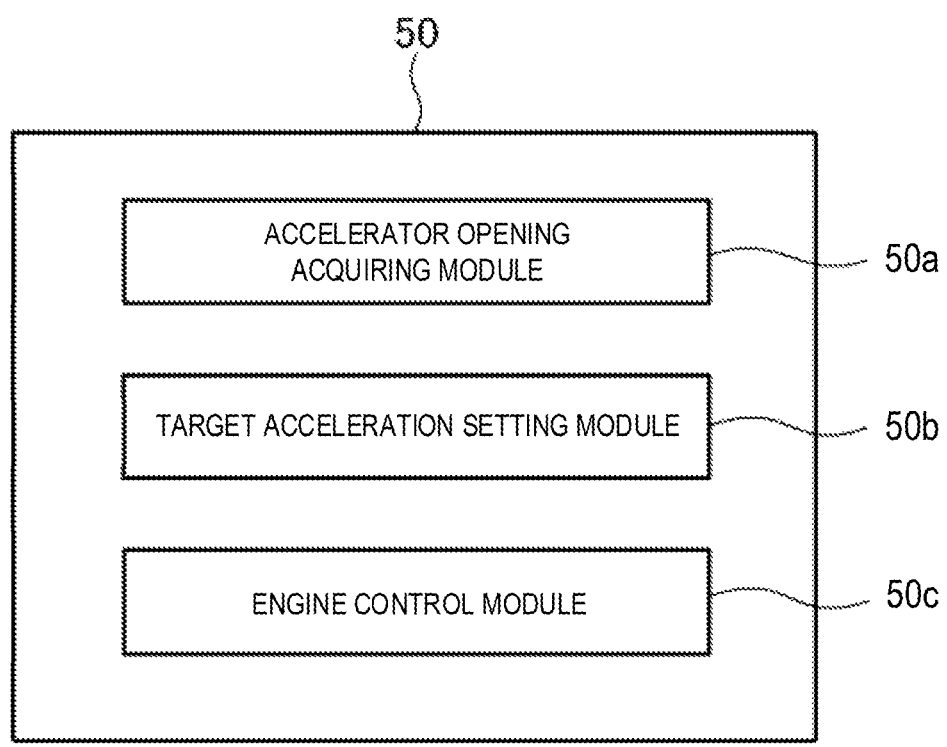
FIG. 3 is a block diagram illustrating a functional configuration of an ECU according to the embodiment of the present invention.

Here, a functional configuration of the ECU 50 of this embodiment is described with reference to FIG. 3. As illustrated in FIG. 3, the ECU 50 of this embodiment functionally has an accelerator opening acquiring module 50a, a target acceleration setting module 50b, and an engine control module 50c.

The accelerator opening acquiring module 50a acquires the accelerator opening (e.g., expressed in "%") based on the detection signal S30 outputted by the accelerator opening sensor 30.

The target acceleration setting module 50b sets a target acceleration of the vehicle based on the accelerator opening acquired by the accelerator opening acquiring module 50a. Specifically, the target acceleration setting module 50b sets the target acceleration corresponding to the accelerator opening acquired by the accelerator opening acquiring module 50a, by referring to a map in which the target acceleration to be set in relation to the accelerator opening is defined before use (acceleration characteristic map).

The engine control module 50c adjusts the engine torque to achieve the target acceleration set by the target acceleration setting module 50b. Specifically, the engine control module 50c sets a target torque required for shifting an actual acceleration to the target acceleration, and controls the throttle valve 5 and/or the intake valve 12 through the variable intake valve mechanism 18, and additionally controls the fuel injector 13, etc., so as to cause the engine 10 to output the target torque.

Thus, the ECU 50 may be referred to as "the control device for the engine."

<Acceleration Characteristic Map>

Next, the acceleration characteristic map of this embodiment, in which a characteristic of the target acceleration to be set in relation to the accelerator opening is defined, is described in detail. As described above, the acceleration characteristic map is used for the target acceleration setting module 50b of the ECU 50 to set the target acceleration.

Figure 4:
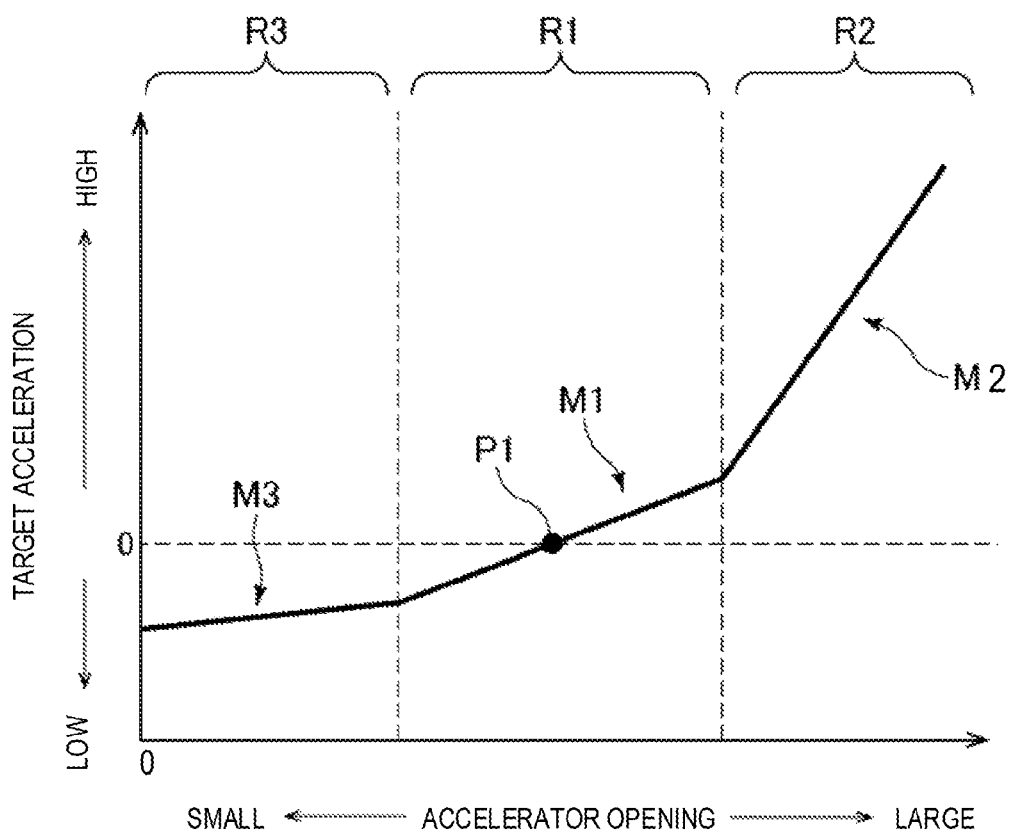
FIG. 4 is a chart illustrating one example of an acceleration characteristic map according to the embodiment of the present invention.

FIG. 4 is a chart illustrating one example of the acceleration characteristic map according to the embodiment of the present invention. In FIG. 4, the horizontal axis indicates the accelerator opening, and the vertical axis indicates the target acceleration. In the vertical axis, the upper side of "0" (zero) indicates values of the target acceleration which cause the vehicle to accelerate, and the lower side of zero indicates values of the target acceleration which cause the vehicle to decelerate (target deceleration). In other words, the "0" at the origin of the chart (where the vertical and horizontal axes intersect) does not mean that the acceleration is zero, but means that the accelerator opening is zero. Note that the acceleration characteristic map in FIG. 4 is a single map applied for a certain gear position and a certain vehicle speed.

As illustrated in FIG. 4, in this embodiment, the accelerator opening is defined to have three ranges (first to third ranges R1, R2, and R3). Further in this embodiment, three acceleration characteristic map segments (first to third acceleration characteristic map segments M1, M2, and M3) are defined as maps which are applied to the first to third ranges R1, R2, and R3, respectively. In this embodiment, the first to third acceleration characteristic map segments constitute the above-described single map applied for a certain gear position and a certain vehicle speed.

The first range R1 of the accelerator opening includes a value of the accelerator opening at which the target acceleration becomes zero (see the point P1). For example, the first range R1 is defined as a range of the accelerator opening where the position of the accelerator pedal 29 varies in a state where the driver applies almost no intentional force on his/her foot placed on the accelerator pedal 29 (i.e., the position of the accelerator pedal 29 varies due to the weight of the foot itself). In one example, a range of about ±5% centering on the value of the accelerator opening corresponding to the point P1 is applied as the first range R1. On the other hand, the second range R2 of the accelerator opening is a range where the accelerator opening is larger than the first range R1, and the third range R3 of the accelerator opening is a range including the accelerator opening "0" and where the accelerator opening is smaller than the first range R1.

Note that the first range R1 including the value of the accelerator opening at which the target acceleration becomes zero is, in other words, a range including a value of the accelerator opening at which traveling resistance (including air resistance, road surface resistance, and resistance received from a road depending on its inclination) balances the drive force which is supplied to the wheels. In other words, the value of the accelerator opening at which the target acceleration becomes zero corresponds to the value of the accelerator opening at which such traveling resistance balances the drive force which is applied to the wheels.

The first acceleration characteristic map segment M1 applied to the first range R1 described above is defined to have a smaller (more gradual) inclination indicating the change of the target acceleration with respect to the change of the accelerator opening, compared to the second acceleration characteristic map segment M2 applied to the second range R2. According to such a first acceleration characteristic map segment M1, the change of the acceleration corresponding to the change of the accelerator opening within the first range R1 is smaller than that within the second range R2 to which the second acceleration characteristic map segment M2 is applied. In other words, the second acceleration characteristic map segment M2 is defined to have a larger (steeper) inclination indicating the change of the target acceleration with respect to the change of the accelerator opening, compared to the first acceleration characteristic map segment M1. According to such a second acceleration characteristic map segment M2, the vehicle smoothly accelerates according to an increase of the accelerator opening within the second range R2.

Further, the first acceleration characteristic map segment M1 is defined to have a larger (steeper) inclination indicating the change of the target acceleration with respect to the change of the accelerator opening, compared to the third acceleration characteristic map segment M3 applied to the third range R3. In other words, the third acceleration characteristic map segment M3 is defined to have a smaller (more gradual) inclination indicating the change of the target acceleration with respect to the change of the accelerator opening, compared to the first acceleration characteristic map segment M1. According to such a third acceleration characteristic map segment M3, the acceleration is adjusted so as not to change greatly according to the variation of the accelerator opening within a range near zero (corresponding to the "play" in the accelerator pedal 29).

In this embodiment, the target acceleration setting module 50b of the ECU 50 selects one of the first to third acceleration characteristic map segments M1 to M3 according to a range under which the accelerator opening acquired by the accelerator opening acquiring module 50a falls among the first to third ranges R1 to R3, and, by using the selected map segment, the target acceleration setting module 50b sets the target acceleration corresponding to the accelerator opening acquired by the accelerator opening acquiring module 50a.

Figure 5A:
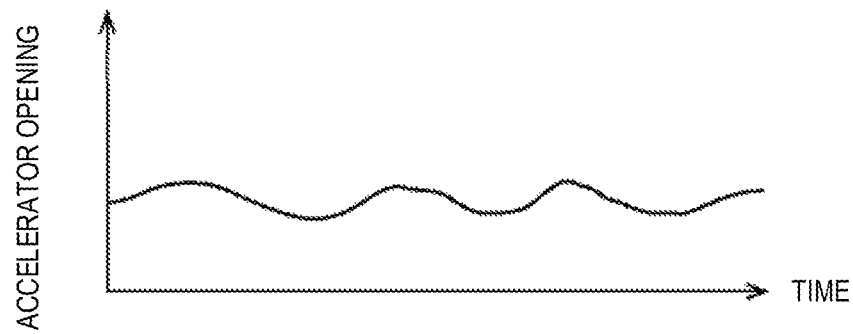
FIGS. 5A to 5C show time charts illustrating changes of an accelerator opening, a target acceleration, and a vehicle speed when a first acceleration characteristic map segment according to the embodiment of the present invention is applied.
Figure 5B:
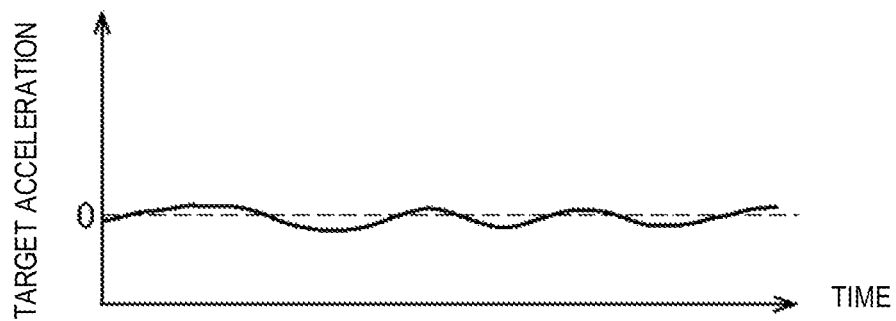
Figure 5C:
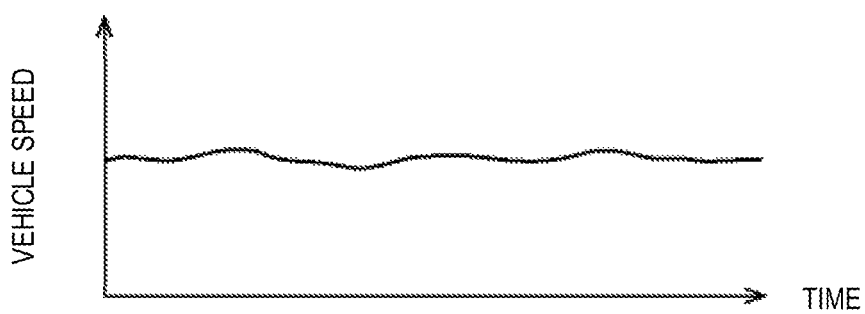

Next, a change of the vehicle speed when the first acceleration characteristic map segment M1 described above is applied is described with reference to FIGS. 5A to 5C. FIGS. 5A to 5C show time charts illustrating changes of the accelerator opening, the target acceleration, and the vehicle speed, respectively, in the case where the first acceleration characteristic map segment M1 of this embodiment is applied when the accelerator opening is within the first range R1.

FIG. 5A illustrates the change of the accelerator opening over time, FIG. 5B illustrates the change of the target acceleration over time, and FIG. 5C illustrates the change of the vehicle speed over time. Here, a case where the accelerator is operated by the driver to keep the vehicle speed constant (typically to keep the vehicle speed low) is considered. In this case, the driver tends to operate the accelerator pedal 29 slightly and repeatedly (see FIG. 5A). Since such slight and repeated operation of the accelerator pedal 29 for keeping the vehicle speed constant is performed within the first range R1 of the accelerator opening including the point P1 (see FIG. 4), the first acceleration characteristic map segment M1 is selected, and the target acceleration is set by using the first acceleration characteristic map segment M1. Therefore, the target acceleration which varies within a small range near zero is set (see FIG. 5B). As a result, the vehicle speed is suitably kept substantially constant (see FIG. 5C).

Here, the first to third acceleration characteristic map segments M1 to M3 illustrated in FIG. 4 (hereinafter, when the segment maps M1 to M3 are not differentiated, they may each simply be referred to as the "acceleration characteristic map segment") are applied for a certain gear position and a certain vehicle speed. In this embodiment, the acceleration characteristic map segments (the acceleration characteristic map as a whole) are basically defined for each gear position (corresponding to an engine load) and each vehicle speed. In other words, in this embodiment, the acceleration characteristic map is defined according to the gear position and the vehicle speed.

Figure 6A:
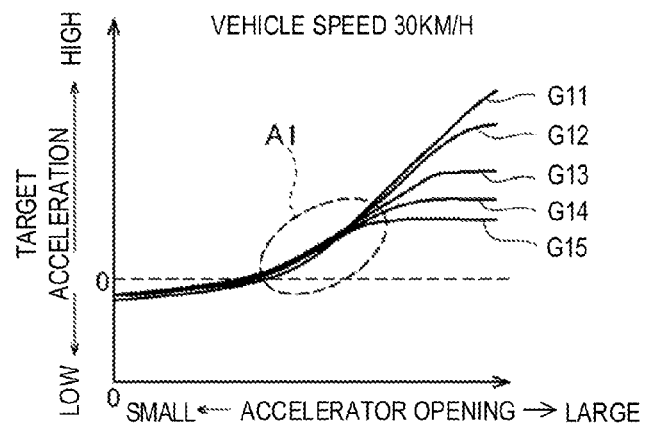
FIGS. 6A to 6C show examples of the acceleration characteristic map for different gear positions and different vehicle speeds, according to the embodiment of the present invention.
Figure 6B:
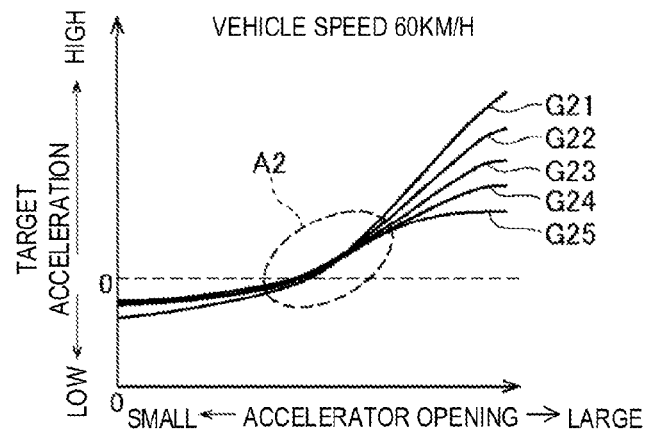
Figure 6C:
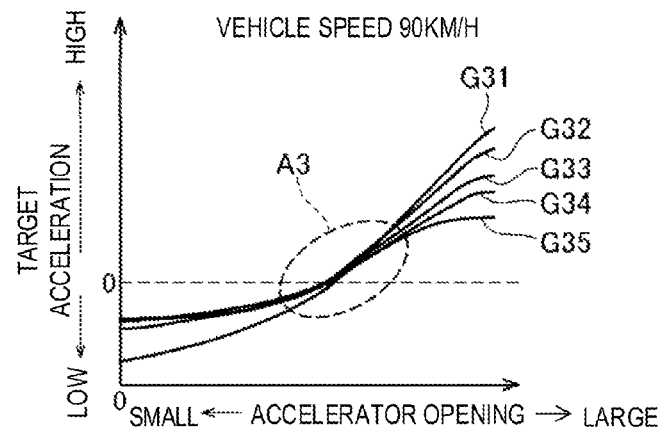

A specific example of the acceleration characteristic map for each gear position and each vehicle speed is described with reference to FIGS. 6A to 6C, which show examples of the acceleration characteristic map for different gear positions and vehicle speeds, respectively, according to this embodiment of the present invention. In FIGS. 6A to 6C, the horizontal axis indicates the accelerator opening and the vertical axis indicates the target acceleration.

Specifically, FIG. 6A illustrates the acceleration characteristic map applied at the vehicle speed of 30 km/h, FIG. 6B illustrates the acceleration characteristic map applied at the vehicle speed of 60 km/h, and FIG. 6C illustrates the acceleration characteristic map applied at the vehicle speed of 90 km/h. Further, the graphs G11 to G15 in FIG. 6A indicate the acceleration characteristic maps applied for five gear positions, respectively. The graphs G21 to G25 in FIG. 6B indicate the acceleration characteristic maps applied for the five gear positions, respectively. The graphs G31 to G35 in FIG. 6C indicate the acceleration characteristic maps applied for the five gear positions, respectively.

Note that in FIGS. 6A to 6C, the acceleration characteristic maps applied for the vehicle speeds 30 km/h, 60 km/h and 90 km/h are illustrated as examples, but in actuality acceleration characteristic maps applied for various other vehicle speeds (which may include 30 km/h, 60 km/h, and 90 km/h) are prepared. Further, the vehicle to which the engine system 100 of this embodiment is applied actually has the six gear positions; however, since a first gear position is exceptional, an acceleration characteristic map applied for the first gear position is not illustrated in FIGS. 6A to 6C.

As indicated by the dashed line areas A1 to A3 in FIGS. 6A to 6C, in this embodiment, the acceleration characteristic map segment M1 applied within the first range R1 described above is defined such that the change of the target acceleration with respect to the change of the accelerator opening becomes substantially constant regardless of the gear position and the vehicle speed. In other words, the acceleration characteristic map segment M1 is defined such that the inclination indicating the change of the target acceleration with respect to the change of the accelerator opening becomes substantially constant regardless of the gear position and the vehicle speed. Thus, within the first range R1, the change of the acceleration with respect to the change of the accelerator opening is substantially the same among various gear positions and vehicle speeds.

On the other hand, the second and third acceleration characteristic map segments M2 and M3 applied within the second and third ranges R2 and R3 (outside the first range R1) are defined such that the change of the target acceleration with respect to the change of the accelerator opening is different, in other words, the inclination indicating the change of the target acceleration with respect to the change of the accelerator opening is different, according to the gear position and the vehicle speed. Thus, within the second and third ranges R2 and R3, especially within the second range R2, the acceleration suitably changes according to a current gear position and a current vehicle speed.

<Control>

Figure 7:
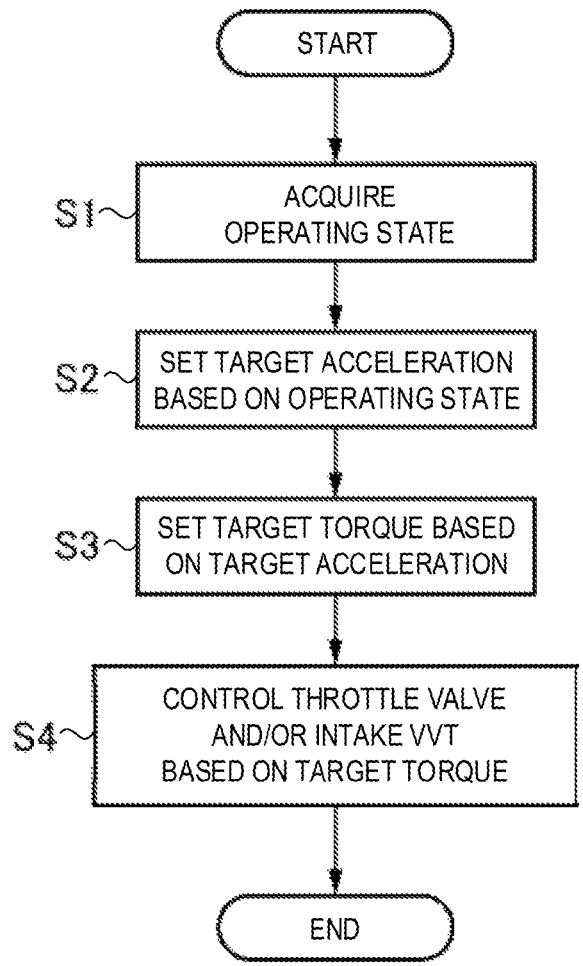
FIG. 7 is a flowchart illustrating an engine control according to the embodiment of the present invention.

Next, the engine control of this embodiment is described with reference to FIG. 7, which is a flowchart illustrating the engine control according to the embodiment of the present invention. This flow is repeated at a predetermined time cycle by the ECU 50 of the engine system 100.

First at S1, the ECU 50 acquires an operating state of the vehicle. Specifically, the ECU 50 acquires, as the operating state of the vehicle, the accelerator opening detected by the accelerator opening sensor 30 (specifically, the accelerator opening acquired by the accelerator opening acquiring module 50a of the ECU 50 based on the detection signal S30 outputted by the accelerator opening sensor 30), the vehicle speed detected by the vehicle speed sensor 39, the gear position currently set at the transmission 202, etc.

Next at S2, the target acceleration setting module 50b of the ECU 50 sets the target acceleration based on the accelerator opening, the vehicle speed, and the gear position acquired at S1. Specifically, the target acceleration setting module 50b first selects an acceleration characteristic map corresponding to the current vehicle speed and the current gear position, from the acceleration characteristic maps defined for various vehicle speeds and gear positions (the acceleration characteristic maps are created and stored in a memory or the like before use). Then, according to the range under which the current accelerator opening falls among the first to third ranges R1 to R3, the target acceleration setting module 50b further selects one of the first to third acceleration characteristic map segments M1 to M3 of the acceleration characteristic map selected based on the vehicle speed and the gear position, and the target acceleration setting module 50b sets the target acceleration corresponding to the current accelerator opening by referring the selected map segment.

Then, at S3, the engine control module 50c of the ECU 50 sets the target torque of the engine 10 so as to achieve the target acceleration set at S2. In this case, the engine control module 50c sets the target torque based on the current vehicle speed, etc., because when the vehicle speed increases, the traveling resistance becomes high, and therefore, the target torque needs to be set to be large. Moreover, the engine control module 50c sets the target torque within a range that the engine 10 can output.

Subsequently, at S4, the engine control module 50c controls the engine 10 to output the target torque set at S3. Specifically, the engine control module 50c adjusts the opening of the throttle valve 5 and/or the operation timing of the intake valve 12 through the variable intake valve mechanism 18 (intake VVT control) by taking into consideration the intake air amount detected by the airflow sensor 31, so that the air amount corresponding to the target torque is introduced into the engine 10. The engine control module 50c also controls the fuel injector 13 to inject the fuel injection amount determined based on the theoretical air-fuel ratio thereof with the air amount which corresponds to the target torque.

<Operations and Effects>

Next, the operations and effects of the control device for the engine of this embodiment are described.

In this embodiment, the accelerator opening is defined to have the first range R1 including the value of the accelerator opening at which the target acceleration becomes zero, the second range R2 where the accelerator opening is larger than the first range R1, and the third range R3 where the accelerator opening is smaller than the first range R1. Further, the first acceleration characteristic map segment M1 applied to the first range R1 is defined such that the inclination indicating the change of the target acceleration with respect to the change of the accelerator opening becomes smaller than the second acceleration characteristic map segment M2 applied to the second range R2, and larger than the third acceleration characteristic map segment M3 applied to the third range R3 (see FIG. 4). By using such first to third acceleration characteristic map segments M1 to M3, the target acceleration corresponding to the accelerator opening is set and the engine torque is adjusted.

According to this embodiment, the first acceleration characteristic map segment M1 in which the inclination indicating the change of the target acceleration with respect to the change of the accelerator opening is gradual is applied within the first range R1 including the value of the accelerator opening at which the target acceleration becomes zero. Therefore, when traveling on a rotary, a roundabout, or a limited speed zone where the vehicle speed is limited to be low, etc., even if the driver operates the accelerator pedal 29 slightly and repeatedly so as to keep the vehicle speed constant, the variation of the target acceleration which is set according to the accelerator opening corresponding to such accelerator operation becomes small. As a result, the vehicle speed can suitably be kept substantially constant (see FIGS. 5A to 5C). Therefore, according to this embodiment, the driver can easily maintain the constant vehicle speed, in other words, can easily control the vehicle to maintain the constant vehicle speed.

Further, according to this embodiment, the second acceleration characteristic map segment M2 in which the inclination indicating the change of the target acceleration with respect to the change of the accelerator opening is steep is applied within the second range R2 where the accelerator opening is larger than the first range R1. Therefore, the vehicle can swiftly be accelerated according to the increase of the accelerator opening within the second range R2. In other words, the driver can gain a satisfactory acceleration feeling. Moreover, according to this embodiment, the third acceleration characteristic map segment M3 in which the inclination indicating the change of the target acceleration with respect to the change of the accelerator opening is more gradual than the first acceleration characteristic map segment M1 is applied within the third range R3 where the accelerator opening is smaller than the first range R1. Therefore, significant variation of the acceleration according to the variation of the accelerator opening near zero, for example, the variation of the accelerator opening caused by the playing of the accelerator pedal 29, can suitably be suppressed.

Here, as another method of adjusting the target acceleration according to the accelerator opening, increasing the target acceleration continuously and linearly as the accelerator opening increases, without defining any range (e.g., first to third ranges R1 to R3) for the accelerator opening, can be considered. In this method, in view of securing the acceleration performance for a range where the accelerator opening is large, an inclination indicating the target acceleration for the entire range of the accelerator opening is set focusing on the range where the accelerator opening is large. Thus, compared to the embodiment, the inclination indicating the change of the target acceleration with respect to the change of the accelerator opening becomes large within a range near the value of the accelerator opening at which the target acceleration becomes zero. Therefore, in this method, it can be said that maintaining the constant vehicle speed as easily as in the embodiment is difficult.

As yet another method of adjusting the target acceleration according to the accelerator opening, increasing the target acceleration continuously and by using one of a quadratic function and an exponential function as the accelerator opening increases, without defining any range (e.g., first to third ranges R1 to R3) for the accelerator opening, can be considered. Also in this method, by focusing on the range where the accelerator opening is large instead of the range around the value of the accelerator opening at which the target acceleration becomes zero, securing the acceleration performance is prioritized. Thus, compared to the embodiment, the inclination indicating the change of the target acceleration with respect to the change of the accelerator opening becomes large within the range around the value of the accelerator opening at which the target acceleration becomes zero. Therefore, also in this method, maintaining the constant vehicle speed as easily as in the embodiment can be said to be difficult.

Other than the methods described above, adjusting the throttle opening to achieve the acceleration corresponding to the accelerator opening by using a map in which a relationship between the accelerator opening and the throttle opening is defined can be considered. In the map used in this method, it can be assumed that the throttle opening does not change linearly according to the accelerator opening (e.g., can be assumed that the throttle opening changes similarly to a case using one of a quadratic function and an exponential function) because if an angle is used to define the throttle opening, an area of a port of the throttle valve does not change linearly according to an angle change of the throttle opening. In other words, an amount of air passing through the throttle valve does not change linearly according to a change of the angle of the throttle opening. Therefore, by defining a map based on the relationship between the accelerator opening and the area of the throttle valve port instead of defining a map based on a relationship between the accelerator opening and the throttle opening as an angle, the map used here indicates a linear relationship between the accelerator opening and the area of the throttle valve port, which means that this method is similar to the method of linearly increasing the target acceleration as the accelerator opening increases.

Further, in this embodiment, the first acceleration characteristic map segment M1 applied within the first range R1 including the value of the accelerator opening at which the target acceleration becomes zero is defined such that the change of the target acceleration with respect to the change of the accelerator opening becomes substantially constant regardless of the gear position and the vehicle speed (FIGS. 6A to 6C). Thus, within the first range R1, the change of the acceleration with respect to the change of the accelerator opening can be substantially the same among various gear positions and vehicle speeds. Therefore, according to the embodiment, the constant vehicle speed can easily be maintained regardless of the gear position and the vehicle speed.

Moreover, in this embodiment, the second and third acceleration characteristic map segments M2 and M3 applied within the second and third ranges R2 and R3 (outside the first range R1) are defined such that the change of the target acceleration with respect to the change of the accelerator opening is different according to the gear position and the vehicle speed (FIGS. 6A to 6C). Thus, within the second and third ranges R2 and R3, especially within the second range R2, the acceleration can suitably be changed according to the gear position and the vehicle speed. Therefore, the acceleration performance can be secured.

<Modifications>

In the above embodiment, the configuration in which the present invention is applied to the engine 10 which is the gasoline engine (see FIG. 2) is provided; however, the present invention is not limited to be applied to the gasoline engine, and may similarly be applied to a diesel engine.

Further, in the above embodiment, the first acceleration characteristic map segment M1 is defined such that the change of the target acceleration with respect to the change of the accelerator opening becomes substantially constant regardless of both of the gear position and the vehicle speed (FIGS. 6A to 6C). In another example, the first acceleration characteristic map segment M1 may be defined such that the change of the target acceleration with respect to the change of the accelerator opening is substantially constant regardless of the vehicle speed, while the change of the target acceleration with respect to the change of the accelerator opening is different according to the gear position. In yet another example, the first acceleration characteristic map segment M1 may be defined such that the change of the target acceleration with respect to the change of the accelerator opening is substantially constant regardless of the gear position, while the change of the target acceleration with respect to the change of the accelerator opening is different according to the vehicle speed.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Intake Passage
5 Throttle Valve
10 Engine
13 Fuel Injector
18 Variable Intake Valve Mechanism
25 Exhaust Passage
29 Accelerator Pedal
30 Accelerator Opening Sensor
39 Vehicle Speed Sensor
50 ECU
50a Accelerator Opening Acquiring Module
50b Target Acceleration Setting Module
50c Engine Control Module
100 Engine System
M1 First Acceleration Characteristic Map Segment (First Acceleration Characteristic Map)
M2 Second Acceleration Characteristic Map Segment (Second Acceleration Characteristic Map)
M3 Third Acceleration Characteristic Map Segment (Third Acceleration Characteristic Map)
R1 First Range
R2 Second Range
R3 Third Range

What is claimed is:

1. A control system for an engine, comprising:
an accelerator opening acquiring module for acquiring an opening of an accelerator;
a target acceleration setting module for setting a target acceleration of a vehicle based on the accelerator opening acquired by the accelerator opening acquiring module; and
an engine control module for adjusting an engine torque to achieve the target acceleration set by the target acceleration setting module,
wherein the accelerator opening is defined to have a first range including a value of the accelerator opening at which the target acceleration becomes zero, a second range where the accelerator opening is larger than the first range, and a third range where the accelerator opening is smaller than the first range, and first to third acceleration characteristic maps in which a relationship between the accelerator opening and the target acceleration is defined are applied to the first to third ranges, respectively,
wherein the target acceleration setting module selects one of the first to third acceleration characteristic maps according to a range under which the acquired accelerator opening falls among the first to third ranges, and the target acceleration setting module sets the target acceleration corresponding to the acquired accelerator opening based on the selected map, and
wherein the first acceleration characteristic map is defined such that an inclination indicating a change of the target acceleration with respect to a change of the accelerator opening is smaller than that in the second acceleration characteristic map and larger than that in the third acceleration characteristic map.

2. The control system of claim 1, wherein the first acceleration characteristic map is defined such that the change of the target acceleration with respect to the change of the accelerator opening becomes substantially constant regardless of a gear position of the vehicle.

3. The control system of claim 1, wherein the first acceleration characteristic map is defined such that the change of the target acceleration with respect to the change of the accelerator opening becomes substantially constant regardless of a vehicle speed.

4. The control system of claim 2, wherein the first acceleration characteristic map is defined such that the change of the target acceleration with respect to the change of the accelerator opening becomes substantially constant regardless of a vehicle speed.

5. A method of controlling an engine, comprising:
acquiring an opening of an accelerator;
setting a target acceleration of a vehicle based on the acquired accelerator opening; and
adjusting an engine torque to achieve the set target acceleration,
wherein the accelerator opening is defined to have a first range including a value of the accelerator opening at which the target acceleration becomes zero, a second range where the accelerator opening is larger than the first range, and a third range where the accelerator opening is smaller than the first range, and first to third acceleration characteristic maps in which a relationship between the accelerator opening and the target acceleration is defined are applied to the first to third ranges, respectively,
wherein setting the target acceleration includes selecting one of the first to third acceleration characteristic maps according to a range under which the acquired accelerator opening falls among the first to third ranges, and setting the target acceleration corresponding to the acquired accelerator opening based on the selected map, and
wherein the first acceleration characteristic map is defined such that an inclination indicating a change of the target acceleration with respect to a change of the accelerator opening is smaller than that in the second acceleration characteristic map and larger than that in the third acceleration characteristic map.

6. The method of claim 5, wherein the first acceleration characteristic map is defined such that the change of the target acceleration with respect to the change of the accelerator opening becomes substantially constant regardless of a gear position of the vehicle.

7. The method of claim 5, wherein the first acceleration characteristic map is defined such that the change of the target acceleration with respect to the change of the accelerator opening becomes substantially constant regardless of a vehicle speed.

8. The method of claim 6, wherein the first acceleration characteristic map is defined such that the change of the target acceleration with respect to the change of the accelerator opening becomes substantially constant regardless of a vehicle speed.

\* \* \* \* \*